(12) United States Patent
May

(10) Patent No.: US 6,524,676 B1
(45) Date of Patent: Feb. 25, 2003

(54) PINCH TAPE

(75) Inventor: Robert C. May, Pittsburgh, PA (US)

(73) Assignee: Nancy May, Pittsburgh, PA (US)

( * ) Notice: Subject to any disclaimer, the term of this patent is extended or adjusted under 35 U.S.C. 154(b) by 36 days.

(21) Appl. No.: 09/712,903

(22) Filed: Nov. 15, 2000

(51) Int. Cl.$^7$ ................................................ B32B 7/06
(52) U.S. Cl. .................... 428/40.1; 428/43; 428/119; 428/122; 248/205.3; 248/473; 40/692.02; 40/651; 40/658
(58) Field of Search ................... 428/40.1, 43, 119, 428/122; 40/658, 643, 644, 642.02, 649, 651, 652; 248/473, 467, 468, 205.3

(56) References Cited

U.S. PATENT DOCUMENTS

| | | |
|---|---|---|
| 3,422,556 A | * 1/1969 | Lyons et al. ................ 40/651 |
| 3,671,004 A | 6/1972 | Cram |
| 3,688,617 A | 9/1972 | Kiley et al. |
| 3,851,353 A | 12/1974 | Wakeman |
| 3,927,438 A | 12/1975 | Blake |
| 4,041,202 A | 8/1977 | Williams |
| 4,520,055 A | 5/1985 | Jeter |
| 5,484,066 A | * 1/1996 | Luisi ........................ 248/205.3 |

* cited by examiner

*Primary Examiner*—Alexander S. Thomas
(74) *Attorney, Agent, or Firm*—McKay & Associates, PC

(57) ABSTRACT

An adhesive tape for holding paper articles such as photographs and notecards edgewise on a surface. Opposing, flexible channel members are formed integral with and extend upwards from the top surface of the tape body to define a longitudinal channel, which receives and pinches the edges of the flat articles, holding the paper article on its edge. An underlying, peel-away sticker exposes an adhesive allowing the tape to be applied to a surface, whereby the flat article is situated perpendicular to the surface.

12 Claims, 2 Drawing Sheets

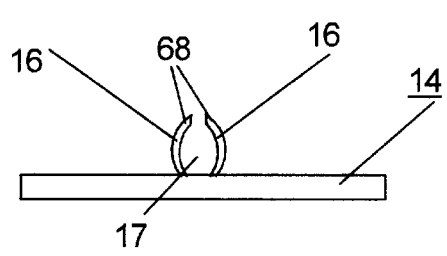
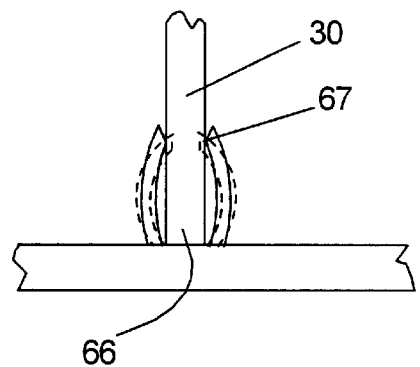
FIG. 6        FIG. 6a
FIG. 7
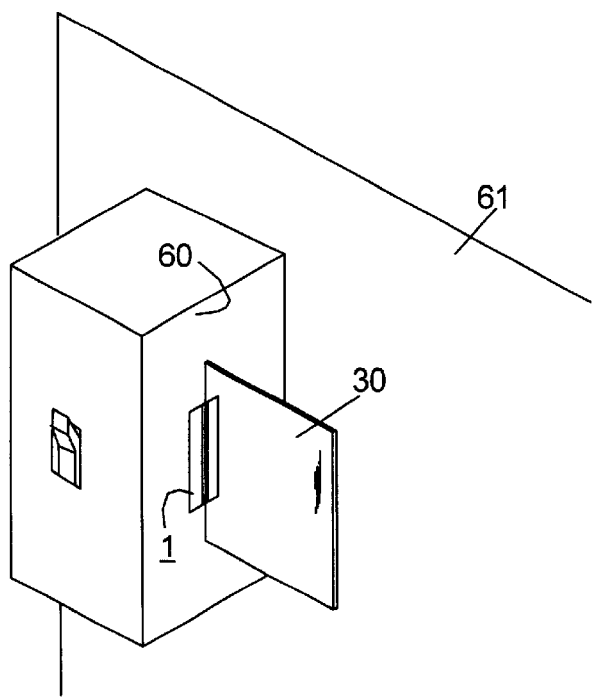

PINCH TAPE

BACKGROUND

1. Field of the Invention

The invention relates generally to adhesive tapes and particularly to tapes having slits or grooves for receiving and securing generally flat articles in an upright position. The adhesive-backed tape of the present invention has a flexible, longitudinal groove for holding pictures or the like edgewise on a flat surface.

2. Description of the Related Art

Tapes having slits or cuts that improve the flexibility or pliability of the tape are known in the art. Generally, most cuts are implemented on tapes or other substrates to allow the tape to be more easily segmented or torn. U.S. Pat. No. 3,688,617, for example, shows a pressure sensitive, vinyl backed roll of adhesive tape whose opposite side faces are slit such that when the tape is unrolled, its opposite edges being slit transversely enable the tape to be easily torn transversely thereof.

It is also known in the art to provide adhesive tapes that are designed to join edges and make a pliable hinge adapted to flexibly connect two items. U.S. Pat. No. 3,851,353 to Wakeman demonstrates a tape construction capable of serving as a pliable hinge by combining two strips, each having mutually projecting fingers. As seen in U.S. Pat. No. 4,041,202, there is disclosed a strippable tape, which can be easily stripped to free joints or flaps of cartons and the like. The bottom layer has an adhesive thereon and a longitudinal cut extending the length of the tape.

As should be known then, cuts and slit features that make up part of tape construction add to the flexibility or pliable nature of the adhesive, thereby allowing the tape to either maintain flat articles in a relatively movable position or ease the segmentation process.

Furthermore, common adhesive tapes not constructed to perform a function beyond that of simple adhesion generally hold an object flat against a surface. Much to the same effect as holding a picture against a billboard with a push-pin, a one or two-sided tape segment is normally placed along the edge or underneath, for example, a flat article to adhere the flat article against the surface. A drawback to the use of standard tape is evident inasmuch as the surface on which the card or picture is applied must be facing the user if the user wishes to view the article. The picture is held flat against the surface, or effectively in the same plane as the surface.

An individual using a computer, for example, may wish to adhere a note or a picture on the periphery of the viewing screen of the monitor, for example, which would be considered the flat surface. However, due to the lack of space along the periphery of the monitor and the aesthetic consequence of sticking notes thereon, there is a need for an adhesive tape that would allow for a flat article to be in view by placement elsewhere than on a front-facing surface.

Adhesion of a flat article may also be problematic when the surface in direct view is being painted or repaired, or in other instances when the surface itself exhibits material properties that are not conducive to such adhesion by a tape. Other surfaces may also be subject to damage if an adhesive tape is applied thereon. In similar instances, the applied tape may also tarnish the surface of a photograph or the like when the tape is removed directly from the article's front-facing surface. Standard tape may further wear out after minimal uses.

It will be further appreciated then that there is a need for an adhesive tape that is adapted to pinch, rather than adhere, generally flat articles in a position in which the article is held normal, or edgewise to a surface. In this manner, the article of interest is in an easily removable and replaceable position and in direct view as that of the front-facing surface, but is not adhering to the front-facing surface and is situated substantially perpendicular to the front-facing surface.

SUMMARY OF THE INVENTION

It is an objective of the present invention to provide an adhesive tape constructed to hold an article edgewise to a flat surface, thereby allowing a flat paper article to be placed on and viewed from a surface alternative to a front facing surface.

It is yet another objective of the present invention to provide an adhesive tape that enables a photograph or the like to be situated in front or on top of a flat surface, whereby the picture is located parallel to the front-facing surface but not directly on the surface. This would be evident when the surface on which the flat article is attached is substantially perpendicular to the front-facing surface.

It is further an objective of the present invention to provide an adhesive tape that enables a photograph or the like to be situated underneath a flat surface, yet still be in direct view.

It is also an objective of the present invention to provide the tape of a construction that has a flexible feature for receiving and pinching the photograph or the like, and which is capable of being formed as roll to be unwound and segmented by perforation.

Accordingly, what is provided is an adhesive pinch tape having a top and adhesive backing revealed after a sticker is peeled therefrom. Two channel members are formed integral with and extend upwards from the top surface to define a longitudinal channel adapted to receive and pinch an edge of a semi-rigid flat article such as a photograph. Each channel member is preferably made of a flexible plastic material or rubber, and in one embodiment shaped semi-circular in cross-section. The tape body having the top and bottom surface is preferably made of a thin plastic or paper material such that the pinch tape can be formed into a compressed roll having perforated segments.

In an alternative embodiment of the present invention, the channel may also be generally U-shaped in cross-section, with each channel member being a mirror image of one another such that the upper tips of each channel member are disposed toward one another. The top of the channel is then narrower than the bottom and the point of contact of the channel members occurs only at this top to increase a flex of each channel member.

BRIEF DESCRIPTION OF THE DRAWINGS

FIGS. 6 and 6a are front views showing an alternative embodiment of the channel of the present invention.

FIG. 7 is a perspective view of the pinch tape segment exemplified in use on a surface normal to a front-facing wall surface such that the flat article is in front of the front-facing surface.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended, and that the invention encompasses such alterations and further modifications in the illustrated device, and such further applications of the principles of the invention illustrated herein, as would normally occur to persons skilled in the art to which the invention relates.

Figure 1:
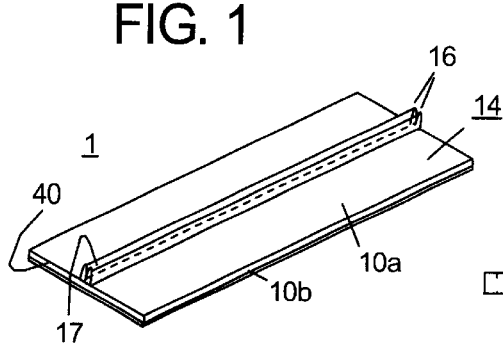
FIG. 1 is a perspective view showing a pinch tape segment.
Figure 2:
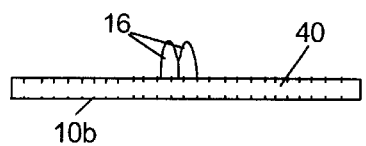
FIG. 2 is a front view of the pinch tape segment.
Figure 3:
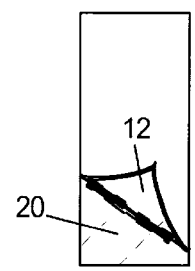
FIG. 3 is a bottom view of the pinch tape segment showing a peel-away sticker revealing the adhesive layer on the bottom.
Figure 4:
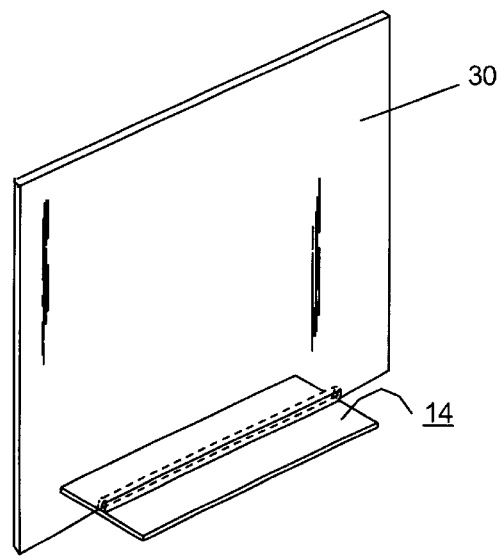
FIG. 4 is a perspective view showing the pinch tape segment in use holding a flat article edgewise within the channel.
Figure 5:
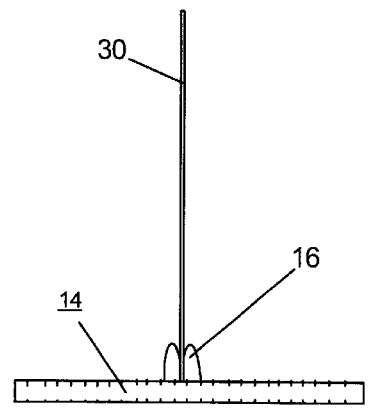
FIG. 5 is a front view of the pinch tape segment pinching the flat article.

Now with reference to FIGS. 1–5, a pinch tape segment 1 of the present invention is shown. The pinch tape segment 1 comprises a tape body 14 having a top surface 10a and an adhesive bottom surface 10b. The tape body may be made of any type of paper or plastic material, or any other suitable flexible paper stock known in the art. A pair of opposing channel members 16 are formed integral with and extend upwards from the top surface 10 to define a longitudinal channel 17. Each channel member 16 is preferably made of a plastic or rubber material, or may be made of any other suitable flexible material that is molded onto the tape body 14.

In the present embodiment, each channel member 16 is generally either circular, or semi-circular in cross-section and arranged opposite one another such that each channel member 16 is in flexible contact with one another until a flat article 30 is inserted therein. When a flat article 30 such as a photograph, business card, or other similar paper article is inserted and pushed down into longitudinal channel 17, the flat article 30 is held edgewise within longitudinal channel 17 due to the compression force provided by each channel member 16. In this manner, the edge of flat article 30 is pinched and the flat article 30 is held perpendicular to the top surface 10a of tape body 14.

A sticker 12, or any other suitable type of clear or opaque laminate, is attached to the bottom surface 10b of tape body 14 by means of an adhesive 20. The sticker 12 is adapted to be peeled away from tape body 14 to reveal the adhesive 20 and allow the pinch tape segment 1 to attach to a surface. In this manner, the flat article 30 can be removed and replaced by another in the same location using the same pinch tape segment 1, thereby minimizing the need for multiple adhesive applications. As is known in the art, the adhesive can include a silicone releasing agent or other suitable means depending on the laminate used to allow the sticker 12 to be peeled therefrom to reveal the adhesive, which may be pressure sensitive.

It is envisioned that each pinch tape segment 1 may be manufactured as an individual segment and packaged in groups, or the pinch tape segment 1 may be made as part of an entire strip of adhesive pinch tape formed into a roll (not shown). The edge 40 of the pinch tape segment 1 with the channel members 16 is perforated throughout to allow the segmentation to occur. Regardless, the pinch tape segment 1 and the shape of each channel member 16 are applicable to any type of size or shape.

FIGS. 6 and 6a show an alternative embodiment of the present invention, wherein the channel members 16 extending from the tape body 14 define a longitudinal channel 17 that is generally u-shaped. In this embodiment, the longitudinal channel 17 defined by channel members 16 is spaced wider at its bottommost portion relative to tape body 14. Multiple flat articles or flat articles 30 generally more-rigid or wider than others can be received herein since the point of contact 67 of each channel member 16 is more flexible and higher above the flat article edge 66 of the flat article 30. The tips 68 of each channel member 67 may further be modified to ease the insertion of the flat article 30 into longitudinal channel 17 by any simple modification, such as by rounding off any corners or declining the tips 68 toward the longitudinal channel 17.

With reference to FIG. 7, a surface being normal to a flat front-facing surface is shown, wherein a flat front-facing surface is used to depict a surface that is then in direct view of an individual. In this example, which by no means limits the invention to this one particular use, the flat article 30 is held edgewise by pinch tape segment 1 on the side of a light box 60 and in front of a wall 61. The pinch tape segment 1 allows the flat article 30 to be in a similar front-facing view as the wall 61, but does not contact the wall 61.

It can further be envisioned then, that a pinch tape segment 1 can also receive and retain a photograph or the like on surfaces above or underneath any front facing surface when the surface on which the pinch tape is applied is generally normal to the front facing surface.

I claim:

1. A flexible, adhesive tape for receiving and holding a generally flat article edgewise on a surface, comprising:

a flexible and segmentable tape body having a top surface and an adhesive bottom surface; and, a pair of channel members disposed opposite and against one another in flexible contact and formed integral with said top surface and extending upwards therefrom, wherein said channel members define a channel situated medially on said tap e body and traveling along a longitudinal axis thereon, for receiving and pinching an edge of said flat article, whereby said flat article can be held edgewise on said top surface of said tape body.

2. The adhesive tape of claim 1, wherein each of said channel members is circular in cross-section.

3. The adhesive tape of claim 1, wherein each of said channel members is semi-circular in cross-section.

4. The adhesive tape of claim 1, wherein said tape body with said channel members is formed as an individual rectangular segment having opposing edges.

5. The adhesive tape of claim 4, wherein said edges are perforated throughout to allow said tape body with said channel members to be segmented from a roll of said adhesive tape.

6. The adhesive tape of claim 1, further comprising a removable sticker attached to said adhesive bottom surface and adapted to being peeled therefrom to reveal said adhesive bottom surface.

7. A flexible, adhesive tape for receiving and holding a generally flat article edgewise on a surface, comprising:

a flexible and segmentable tape body having a top surface and an adhesive bottom surface; and, a pair of flexible, opposing channel members formed integral with said top surface and extending upwards therefrom and being curved toward one another to define a channel generally u-shaped in cross-section and situated medially on said tape body and traveling along a longitudinal axis thereon, for receiving and pinching an edge of said flat article, whereby said flat article can be held edgewise on said top surface of said tape body.

8. The adhesive tape of claim 7, wherein said tape body with said channel members is formed as an individual rectangular segment having opposing edges.

9. The adhesive tape of claim 8, wherein said edges are perforated throughout to allow said tape body with said channel members to be segmented from a roll of said adhesive tape.

10. The adhesive tape of claim 7, further comprising a removable sticker attached to said adhesive bottom surface and adapted to being peeled therefrom to reveal said adhesive bottom surface.

11. The adhesive tape of claim 7, wherein upper tips of each of said channel members are rounded.

12. The adhesive tape of claim 7, wherein upper tips of each of said channel members decline towards said longitudinal channel.

* * * * *